J. E. ELDER.
WEEDING MACHINE.
APPLICATION FILED FEB. 10, 1916.
1,185,891.
Patented June 6, 1916.
2 SHEETS—SHEET 2.
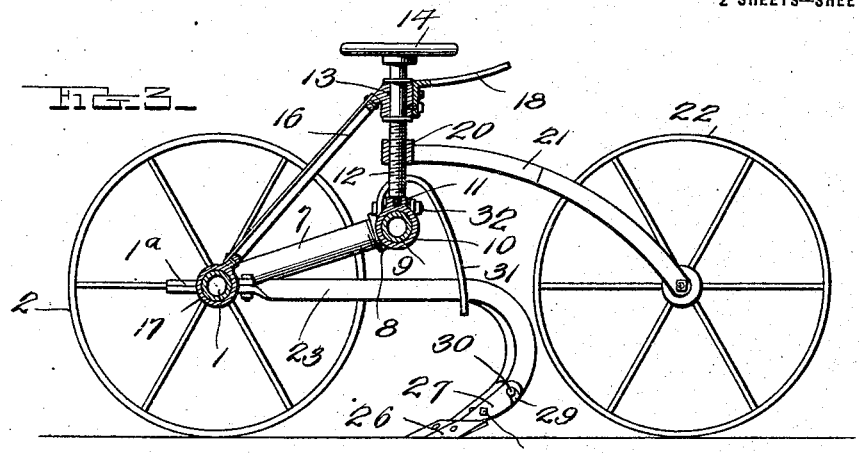
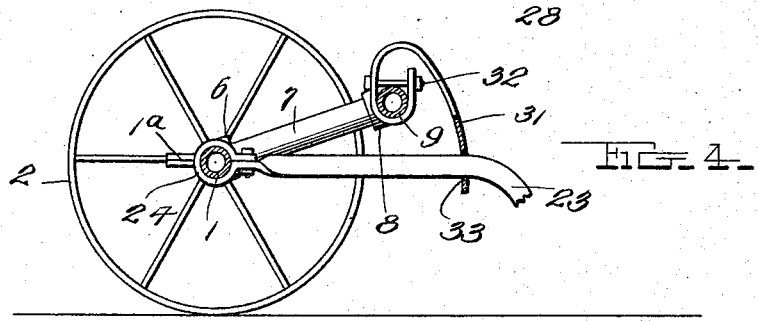
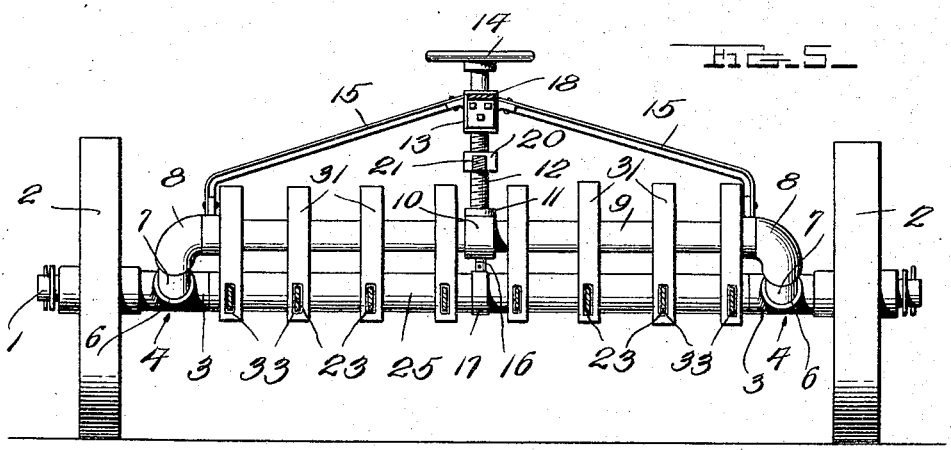
Witness
J. R. Pierce
Inventor
J. E. Elder
By H. B. Willson & Co.
Attorneys

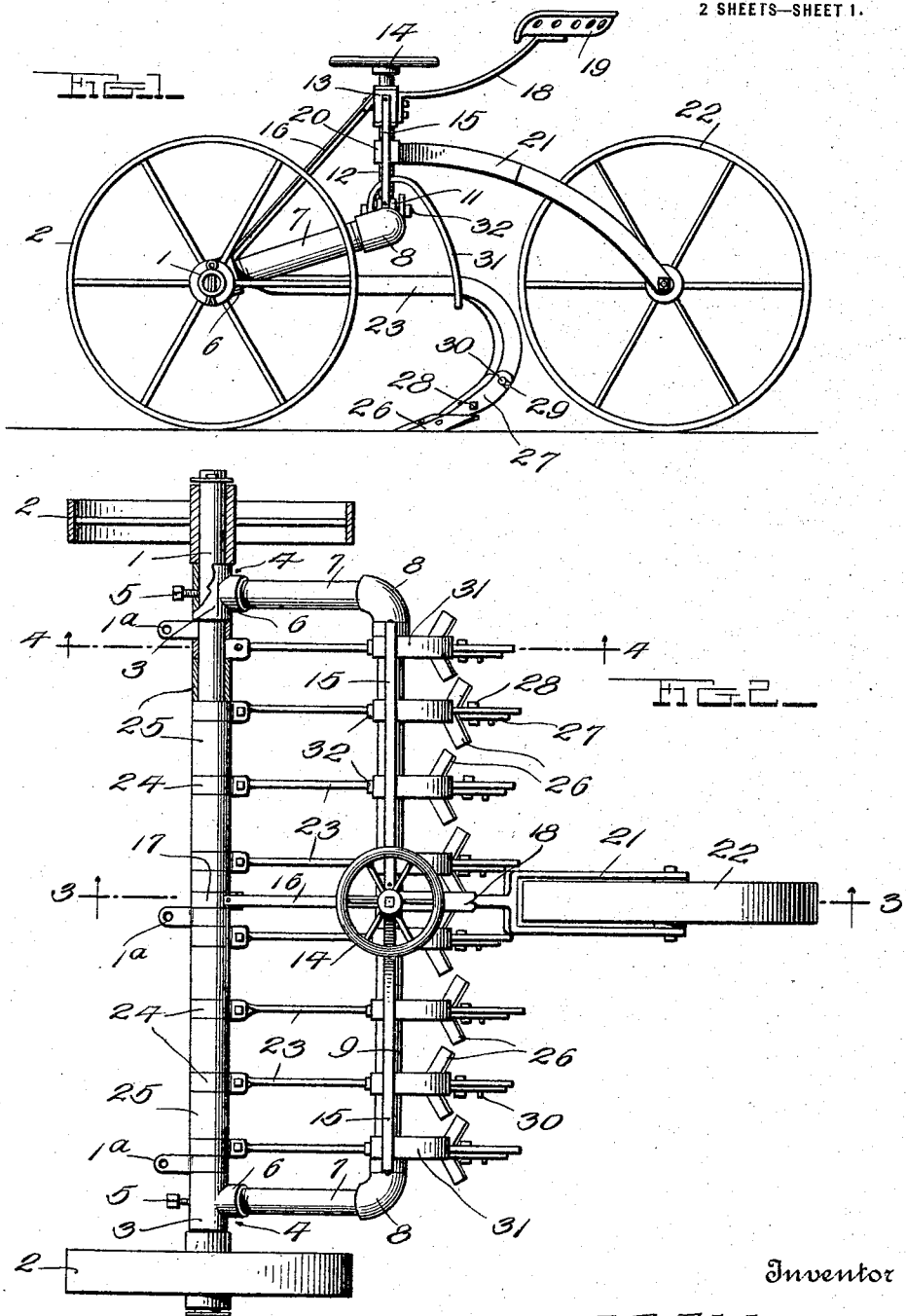

UNITED STATES PATENT OFFICE.

JAMES EDWIN ELDER, OF HIGHWOOD, MONTANA.

WEEDING-MACHINE.

1,185,891.

Specification of Letters Patent.   Patented June 6, 1916.

Application filed February 10, 1916. Serial No. 77,463.

*To all whom it may concern:*

Be it known that I, JAMES EDWIN ELDER, a citizen of the United States, residing at Highwood, in the county of Chouteau and State of Montana, have invented certain new and useful Improvements in Weeding-Machines; and I do declare the following to be a full, clear, and exact description of the invention, such as will enable others skilled in the art to which it appertains to make and use the same.

My invention relates broadly to improvements in agricultural machines and more particularly to one designed for weeding purposes, the object of the invention being to provide a machine of this class of extremely simple and inexpensive construction, yet one which will be highly efficient and durable.

With this general object in view, the invention resides in certain novel features of construction and in unique combinations of parts to be hereinafter fully described and claimed, the descriptive matter being supplemented by the accompanying drawings which constitute a part of this application and in which:

Figure 1 is a side elevation of a machine constructed in accordance with my invention; Fig. 2 is a top plan view thereof with parts broken away and in section; Figs. 3 and 4 are longitudinal sectional views as seen on the planes indicated by the lines 3—3 and 4—4 of Fig. 2; and Fig. 5 is a rear elevation partly in section.

In specifically describing the construction shown in the drawings above briefly described, similar reference characters will be placed on corresponding parts throughout the several views and reference will be herein made to the numerous elements by their respective indices. To this end, the numeral 1 designates a one-piece axle either constructed of a single length of pipe or of an appropriate solid bar, the opposite ends of said axle being equipped with wheels 2 rotatably mounted thereon. Surrounding the end portions of the axle 1 and serving as stops to prevent inward movement of the wheels 2, are the heads 3 of a pair of T-couplings 4, said heads being secured to the axle by any preferred means such as set screws 5. The shanks 6 of the T-couplings extend rearwardly and receive therein the threaded front ends of a pair of longitudinally disposed arms 7 in the form of short lengths of pipe, the rear ends of said arms being threaded into elbows 8 which are in turn threaded on the opposite ends of a one-piece horizontal length of pipe 9 which is disposed in rear of and parallel to the axle 1. For the frame structure so far described, piping is preferably used throughout on account of the fact that it is not only light but sufficiently rigid to perform the functions required. However, it will be understood that the frame could be constructed by using solid bars in place of the pipes described.

Secured by an appropriate clamp or the like 10 to the center of the bar 9 is a bearing 11 in which the lower end of an upright jack screw 12 is swiveled, the upper end of said screw being mounted in a bearing 13 and being equipped with a hand wheel or the like 14. The bearing 13 is carried by a pair of inclined angle-iron braces 15 secured at their upper ends thereto and at their lower ends to the ends of the bar 9. In addition to the bar 15, an additional angle-iron bar 16 inclines downwardly and forwardly from the aforesaid bearing 13 and is connected by a clamp or the like 17 to the center of the axle 1. The bearing 13 is also used as a means for attaching the spring 18 to the driver's seat 19.

The intermediate portion of the jack screw 12 is threaded through a nut 20 secured in any preferred manner to the front end of a rearwardly extending fork 21 in which a caster wheel 22 is mounted. Thus, by proper actuation of the hand wheel 14, the entire rear end of the frame may be raised and lowered at will.

Underlying the pipe 9 is a plurality of parallel drawbars 23 whose front ends are given a quarter turn and bent to form cylindrical bearings 24 mounted loosely upon the axle 1 and held in correctly spaced relation thereon by sleeves 25 surrounding said axle and interposed between said bearings. The downwardly curved rear ends of the drawbars 23 carry weeding blades 26 of any appropriate shape, preferably secured permanently to approximately upright arms 27 which are frictionally pivoted near their lower ends to the lower extremities of the aforesaid drawbars as shown at 28, the upper ends of said arms having rearwardly facing notches 29 normally engaging studs or the like 30 projecting laterally from said drawbars. By this arrangement, under ordinary circumstances the blades 26 will remain in normal position and will effectively sever the weeds and grass with which they come in contact. However, in case a rock or the like is struck which might otherwise injure the blades, they may rock around the pivots 28. During this movement, it is necessary that the drawbars rock upwardly, but under desirable conditions they are to be prevented from so moving and held in yieldable engagement with the earth. To attain these ends, a plurality of flat arcuate springs 31 is provided, said springs being positioned in rear of the pipe 9 and having their upper ends bent around said pipe and clamped thereon by bolts 32. These bolts, however, do not pass through the pipe but merely through the springs as shown. The lower ends of the numerous springs 31 are formed with slots 33 through which the drawbars 23 pass. Thus, these bars are allowed to move as above specified.

The machine as above described may be drawn by any number of draft animals and may be equipped with any preferred means for hitching such animals thereto. In the present embodiment of the invention, however, a trio of metal straps 1ª are shown as looped around the axle 1 for the attachment of suitable draft devices.

From the foregoing description, taken in connection with the accompanying drawings, the construction, manner of operation and advantages of my improved weeder will be readily understood without requiring a more extended explanation. In conclusion, however, I will state that although certain specific details of construction have been shown for illustrative purposes, numerous changes may be made within the scope of the invention as claimed.

I claim:—

1. In combination, a horizontal one-piece axle having wheels mounted on its opposite ends, a pair of T-couplings having their heads secured on said axle contiguous to the hubs of said wheels to prevent inward movement of the latter, a pair of parallel rearwardly extending arms having their front ends secured in said T-couplings, a pair of elbows in which the rear ends of such arms are secured, a one-piece bar positioned parallel to the axle and having its ends secured in said elbows, a plurality of longitudinally disposed drawbars underlying said transverse bar and pivoted at their front ends to the axle, and a plurality of flat arcuate springs having one end clamped around said bar, the other ends of said springs being formed with slots receiving the drawbars.

2. In combination, a transverse wheel supported axle, a pair of arms extending rearwardly therefrom, a transverse horizontal bar disposed parallel to the axle and carried by the rear ends of said arms, a plurality of implement drawbars pivoted at their front ends to the axle, means connecting the drawbars with said transverse horizontal bar, a bearing secured to the center of said bar, an upright jack screw swiveled in said bearing, an additional bearing receiving therein the upper end of said screw, inclined brace bars extending from said additional bearing to the ends of the aforesaid transverse bar, an additional brace bar extending from the last named bearing to the center of the axle, a fork having a caster wheel mounted therein, and a nut carried by said fork and receiving the jack screw therein.

3. In combination, a transverse axle having a supporting wheel at each end, a pair of arms connected to and extending rearwardly from said axle, the connection between said arms and axle serving to prevent inward movement of the wheels, a rigid transverse bar secured at its ends to the rear ends of said arms and lying parallel to the aforesaid axle, a plurality of implement draw bars below said bar and pivotally connected at their front ends to the axle, and springs secured to the aforesaid transverse bar for depressing said draw bars.

4. In combination, a rigid transverse axle having wheels at its opposite ends, a pair of arms extending rearwardly from said axle, a rigid transverse bar secured at its ends to the rear ends of said arms, a plurality of transversely spaced longitudinally disposed implement draw bars having eyes at their front ends mounted loosely on the axle, spacing sleeves surrounding the said axle and interposed between said eyes, and springs secured to the aforesaid transverse bar for depressing the draw bars.

5. In combination, a rigid transverse axle having supporting wheels at its opposite ends, a pair of arms extending rearwardly from said axle adjacent the wheels, a rigid transverse bar secured at its ends to the rear ends of said arms, a plurality of implement draw bars pivoted at their front ends to the axle, springs secured to the aforesaid transverse bar for depressing said draw bars, a third wheel in rear of the draw bars, a fork in which said third wheel is mounted, said fork extending forwardly from said wheel, and a vertically adjustable connection between the front end of said fork and the aforesaid bar, said fork being mounted for lateral swinging.

In testimony whereof I have hereunto set my hand in presence of two subscribing witnesses.

JAMES EDWIN ELDER.

Witnesses:
L. E. TOBEY,
NELL SAMPSON.